US011868503B2

(12) United States Patent
Cannon et al.

(10) Patent No.: US 11,868,503 B2
(45) Date of Patent: Jan. 9, 2024

(54) RECOMMENDING POST MODIFICATIONS TO REDUCE SENSITIVE DATA EXPOSURE

(71) Applicant: International Business Machines Corporation, Armonk, NY (US)

(72) Inventors: Gray Franklin Cannon, Miami, FL (US); Indervir Singh Banipal, Austin, TX (US); Shikhar Kwatra, San Jose, CA (US); Raghuveer Prasad Nagar, Rajasthan (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 190 days.

(21) Appl. No.: 17/103,353

(22) Filed: Nov. 24, 2020

(65) Prior Publication Data

US 2022/0164472 A1 May 26, 2022

(51) Int. Cl.
*G06F 21/62* (2013.01)

(52) U.S. Cl.
CPC .............................. *G06F 21/6245* (2013.01)

(58) Field of Classification Search
CPC ... G06F 21/62; G06F 21/6218; G06F 21/6245
See application file for complete search history.

(56) References Cited

U.S. PATENT DOCUMENTS 8,955,153 B2   2/2015 Altaf et al.
9,374,374 B2   6/2016 Steinberg et al.
(Continued)

FOREIGN PATENT DOCUMENTS

CN    1168064 C     9/2004
CN    100449507 C   1/2009
(Continued)

OTHER PUBLICATIONS

Canfora et al., A NLP-based Solution to Prevent from Privacy Leaks in Social Network Posts, In Proceedings of the 13th International Conference on Availability, Reliability and Security (pp. 1-6). Aug. 27-30, 2018.
(Continued)

*Primary Examiner* — D'Arcy Winston Straub
(74) *Attorney, Agent, or Firm* — Garg Law Firm, PLLC; Rakesh Garg; Michael O'Keefe

(57) ABSTRACT

An embodiment associates a user's post data that with a category from a predefined list of categories based on the post content. The embodiment analyzes, using machine learning, the post data for potentially sensitive content and generates a first sensitive data indicator identifying potentially sensitive information in the post data and an associated first confidence value. The embodiment generates explanatory data identifying a feature that contributed to the post data being identified as potentially sensitive, and generates a modified version of the post data that modifies the feature. The embodiment analyzes the modified post data for potentially sensitive content and generates a second sensitive data indicator and a second confidence value indicating that the post data is more likely to contain sensitive data than the modified post data. The embodiment alerts the user regarding the potentially sensitive data and recommends changing the post based on the modified feature value.

20 Claims, 9 Drawing Sheets

(56) References Cited

U.S. PATENT DOCUMENTS

| | | | |
|---|---|---|---|
| 9,996,811 | B2 | 6/2018 | Matus et al. |
| 2004/0068447 | A1* | 4/2004 | Mao .................. G06Q 30/0601 |
| | | | 705/26.1 |
| 2013/0340089 | A1 | 12/2013 | Steinberg et al. |
| 2014/0007249 | A1 | 1/2014 | Altaf et al. |
| 2015/0161538 | A1 | 6/2015 | Matus et al. |
| 2016/0381034 | A1* | 12/2016 | Chan ..................... H04L 51/212 |
| | | | 726/26 |
| 2019/0130123 | A1* | 5/2019 | Ben-Yair ............... G06F 21/606 |
| 2019/0266355 | A1* | 8/2019 | Lockhart, III ...... G06F 21/6263 |
| 2019/0325335 | A1* | 10/2019 | Chan ........................ G06N 5/01 |
| 2021/0124844 | A1* | 4/2021 | Ghazinour Naini ........................ |
| | | | G06F 21/6263 |

FOREIGN PATENT DOCUMENTS

| | | |
|---|---|---|
| JP | 4679093 B2 | 4/2011 |
| KR | 100860162 B1 | 9/2008 |

OTHER PUBLICATIONS

Wu, An Automated Privacy Information Detection Approach For Online Social Media, Doctoral dissertation, Auckland University of Technology, Jul. 2019.

Alsarkal et al., Protecting Privacy on Social Media: Is Consumer Privacy Self-Management Sufficient?, Proceedings of the 52nd Hawaii International Conference on System Sciences, 2019.

Wang et al., #DontTweetThis: Scoring Private Information in Social Networks, Proceedings on Privacy Enhancing Technologies, 2019(4), 72-92, 2019.

Feyisetan et al., Privacy- and Utility-Preserving Textual Analysis via Calibrated Multivariate Perturbations, In Proceedings of the 13th International Conference on Web Search and Data Mining (pp. 178-186), Jan. 2020.

Imran-Daud et al., Privacy-driven Access Control in Social Networks by Means of Automatic Semantic Annotation, Computer Communications, 76, 12-25. 2016.

* cited by examiner

RECOMMENDING POST MODIFICATIONS TO REDUCE SENSITIVE DATA EXPOSURE

BACKGROUND

The present invention relates generally to a method, system, and computer program product for managing sensitive data. More particularly, the present invention relates to a method, system, and computer program product for recommending post modifications to reduce sensitive data exposure.

A social media network is a mechanism that facilitates connection between people and information in an organized manner, which enables and facilitates the sharing of information between members of the social media network. Social media network services involve the representation of each user (e.g., a profile), social links, and a variety of additional services. A large number of web-based social media networks exist (i.e., online social networks), which include services that allow users of the social media network to create a public profile, to create a list of users with whom to share connection, and to share and send messages throughout the network.

Social media has become a common vehicle for mass communication and interaction. Discussion boards, forums and other social networking websites are increasingly used for this purpose. A fundamental concept of social media is the ability to share "something" in the form of a "post." In the age of social media, Internet users are able to share their opinions instantaneously in response to events, ideas, and products in the form of posts, such as shared social media content, comments, and product reviews. The immediacy of user interactions can lead to inadvertent disclosure of sensitive user information.

SUMMARY

The illustrative embodiments provide for recommending post modifications to reduce sensitive data exposure. An embodiment includes associating post data that includes data representative of post content authored by a user with a category from a predefined list of categories having a strongest correlation with the post content based on an entity in the post content. The embodiment also includes analyzing, using a machine learning classifier, the post data for potentially sensitive content. The embodiment also includes generating, responsive to the analyzing of the post data, a first sensitive data indicator associated with the post data and a first confidence value, wherein the first sensitive data indicator identifies the post data as potentially containing sensitive information, and wherein the first confidence value represents a first degree of certainty that the post data contains sensitive information. The embodiment also includes generating explanatory data associated with the first sensitive data indicator of the post data, wherein the explanatory data identifies a feature of the post data that contributed to the post data being identified as potentially containing sensitive information. The embodiment also includes generating a modified version of the post data that changes the feature to have a modified feature value. The embodiment also includes analyzing, using the machine learning classifier, the modified version of the post data for potentially sensitive content. The embodiment also includes generating, responsive to the analyzing of the modified version of the post data, a second sensitive data indicator associated with the modified version of the post data and a second confidence value, wherein the second sensitive data indicator identifies the modified version of the post data as potentially containing sensitive information, and wherein the second confidence value represents a second degree of certainty that the modified version of the post data contains sensitive information. The embodiment also includes that the second confidence value differs from the first confidence value so as to indicate that the post data is more likely to contain sensitive data than the modified version of the post data. The embodiment also includes issuing an alert to the user indicating that the post data potentially contains sensitive data and recommending a post modification that that changes the feature to have the modified feature value. Other embodiments of this aspect include corresponding computer systems, apparatus, and computer programs recorded on one or more computer storage devices, each configured to perform the actions of the embodiment.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
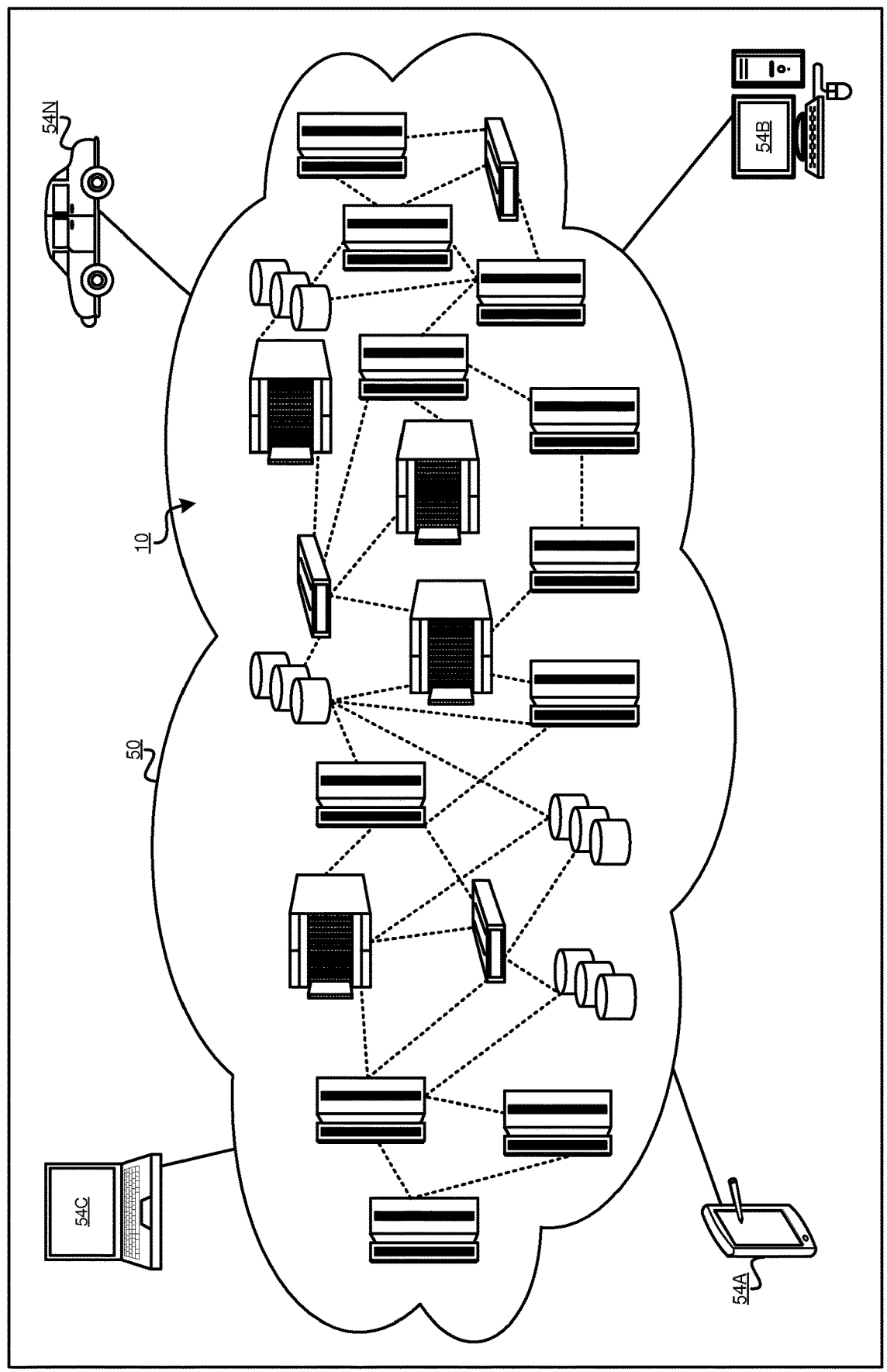
FIG. 1 depicts a cloud computing environment according to an embodiment of the present invention.

A social network user posting information to a social network may inadvertently share sensitive information online that others may seek to exploit in such a way that negatively affects the user. For example, other users seeking to negatively exploit posted information may use posted information for planning illicit activity based on information gleaned from the user's posted content. While governments increasingly enact laws aimed at protecting personal data, users can best defend themselves against exploitation by controlling the data they personally disclose in posts on social networks.

Some privacy-concerned users see digital abstinence as the only means for data protection. However, this stance precludes the user from a multitude of products, services, and experiences. Other users may be cumbersome to manually analyze and predict all prospective undesirable side-effects that could result from the user's posts to a social network.

The illustrated embodiments recognize that data self-management and regulation is an arduous problem for users to manage manually. The illustrated embodiments address this problem by identifying potential sensitive data posted to social media and providing remediation recommendations to the user. In some embodiments, an application identifies potentially sensitive data in a post before it is posted to social media and provides recommendations to avoid disclosure of sensitive information.

As used herein, "social network" refers to a computer network connecting entities, such as people or organizations, by a set of social relationships, such as friendship, co-working, or a community representing a group of members sharing common interests or characteristics, or a platform that includes functionality that allows users to post content, such as product or service reviews, comments, feedback, or other forms of content that can be viewed by one or more other users. Non-limiting examples of social networks as referred to herein include blogs, forums, e-commerce sites that allow users to post product reviews, and media sites that allow users to post comments. A social network as referred to herein also includes a computer application or data connecting users by social relationships. A social network may provide an avenue for users to post information and respond to previously posted information. Members of a social network may elect to exchange information with or transmit information to all participants within the social network or a subset of all participants.

In the illustrated embodiments, an application according to disclosed embodiments associates post data with a category from a predefined list of categories based on the post content. For example, in some embodiments, the application defines sensitive data categories, for example contact information, financial information, relationship information, employment information, interests, group affiliation, and travel schedules. In some embodiments, the application references historical information-usage data, which comprises publicly known data-abuse events to determine which data categories are most abused. In some embodiments, the application considers the prevalence and impact of data-abuse events for different categories to determine an amount of risk associated with disclosure of data in different categories. In some embodiments, the application generates abuse prevalence values and impact level values for each category based on the data-abuse events related to the various categories. For example, in an embodiment, the abuse prevalence value represents a number of data-abuse events for a given category per number of posts having data in the given category, and the impact level value is based on the consequences of data abuse for data in the given category. In an embodiment, impact levels include the following levels, each of which can be assigned a different numerical value:

Low impact: Individuals may encounter a few minor inconveniences, which they will overcome without any problem (time spent re-entering information, annoyances, irritations, etc.).

Medium impact: Individuals may encounter significant inconveniences, which they will be able to overcome despite a few difficulties (extra costs, denial of access to business services, fear, lack of understanding, stress, minor physical ailments, etc.).

High impact: Individuals may encounter significant consequences, which they should be able to overcome albeit with serious difficulties (misappropriation of funds, blacklisting by financial institutions, property damage, loss of employment, subpoena, worsening of health, etc.).

Very high impact: Individuals may encounter significant, or even irreversible consequences, which they may not overcome (inability to work, long-term psychological or physical ailments, etc.).

In some embodiments, an application calculates a risk value for each category based on the abuse prevalence value and impact level value for each category. For example, in an embodiment, the application calculates a weighted average of the abuse prevalence value and impact level value for a category to derive a risk score for that category.

In an embodiment, an application adjusts the risk values for each category based on the intended audience of a post based on past associations and activities of the audience. For example, a post on a web page that is only accessible to a private group of verified users is less risky than a post on a publicly-accessible web page that anyone can access.

For example, in some embodiments, an application evaluates post data stored in an external-account-post repository. In some embodiments, the application evaluates post data received with a user post request from a user system prior to the post data being posted on a social media site. In some such embodiments, the user post request includes a Hypertext Transfer Protocol (HTTP) request from a user system as a client device to an external system, where the request includes post data describing post content to post on a web page hosted by the external system. In some such embodiments, the application recognizes the HTTP request being directed to an external system submitted by the user as being associated with the user's social media accounts, for example based on a the HTTP request including a Uniform Resource Locator (URL), a network identifier, a username, and/or user account credentials that match a URL, network identifier, username, and/or user account credential for an external systems that was previously submitted by the user. In some embodiments, the application serves as a proxy, web browser plugin, an application on a computing device, such as a desktop computer, tablet, or smart phone, or a module of an application on a desktop computer, tablet, or smart phone, allowing the application to evaluate the post data in route to the external system. In some embodiments, if the application does not detect potentially sensitive information in the post data, the application releases the post data to the external system for posting; if the application detects potentially sensitive information in the post data, the application interrupts the transmission of the post data to the external system in order to alert the user to the potentially sensitive content detected in the post data.

In some embodiments, an application evaluates post data that includes data representative of post content authored by a user and associates the post data with a category from the predefined list of categories in data storage having a strongest correlation with the post content based on the post content. In some embodiments, the application searches an external-account-post repository for user posts that correspond with one or more of the categories, and flags posts that contain sensitive terms (entities) and the location of original post. In some embodiments, the application evaluates a variety of different types of posts, including user reviews (e.g., product reviews), reactions (e.g., "Likes" or "Favorites" types of reactions to some content indicating an approval or belief in that content), gestures (e.g., "Nodding" in video in response to what is being said in the video indicating an approval or belief in what is being said), online reviews, discussions, comments, and blogs. In some embodiments, the application evaluates a variety of different formats of posts, such as text (e.g., blog post about recent conference), speech (e.g., review submitted through a virtual assistant), images, and video (e.g., photo posted of specific car model may suggest the user is the owner of that model). In some embodiments, non-text posts are converted to text using available conversion technology, e.g., image recognition processing for images and video or speech-to-text processing for audio.

In the illustrated embodiments, an application analyzes the post data for potentially sensitive content using a machine learning classifier. In some embodiments, the application analyzes the post data for potentially sensitive content using a machine learning classifier. In some embodiments, the application trains the machine learning classifier with sensitive and non-sensitive entities to predict sensitive data values. In some embodiments, the classification models can be used to identify sensitive entities for classifications such as Employment status, Income level, Marital status, Parent status, etc.

In some embodiments, an application performs semantics processing to enhance text categorization by considering context of the text. In some embodiments, the application performs tone analysis to identify emotions associated with a post, such as posts expressing negative emotions that a user may not want to share, for example anger, disgust, or disappointment. In some embodiments, the application performs contentiousness analysis to identify posts that convey controversial topics by searching for posts having highly variant reactions, such as both a large number of "likes" or other indications of agreement from other users, and a large number of "dislikes" or other indications of disagreement from other users.

In some embodiments, an application combines posts having similar content, such as a common or synonymous terms, and evaluates the combined post data. In some such embodiments, the application collects a first portion of the post content from a first network accessible computer system and collects a second portion of the post content from a second network accessible computer system.

In the illustrated embodiments, an application generates a sensitive data indicator and a confidence value based on the analysis of the post data. In some embodiments, the application generates a sensitive data indicator and a confidence value associated with the post data based on the results of the machine learning classifier. The sensitive data indicator identifies the post data as potentially containing sensitive information, and the confidence value represents a degree of certainty with which the machine learning classifier determined that the post data contains sensitive information.

In the illustrated embodiments, an application generates explanatory data that identifies features of the post data that contributed to the potentially sensitive classification. In some embodiments, the application generates explanatory data associated with the sensitive data indicator of the post data. The explanatory data identifies one or more features of the post data that most strongly contributed to the results from the machine learning classifier. For example, in some embodiments, the feature is representative of a portion of the post content or a property of an intended audience of the post content when posted. In some embodiments, explanation algorithms can be used to determine features that caused classifier to predict sensitive category/classification (e.g., using open source Python libraries such as LIME (Local Interpretable Model-agnostic Explanations) or SHAP (SHapley Additive exPlanation)) (Python is a trademark of Python Software Foundation Corporation Delaware).

In the illustrated embodiments, an application performs one or more iterations of tasks related to generating recommended edits by removing different combinations of terms from post content and recalculating the confidence score for the post data for each modified version of the post data until an acceptable score is achieved. In some embodiments, an acceptable confidence score is a confidence score that is below a threshold value preset by the application or by the user as part of the user preferences stored with the user information.

In the illustrated embodiments, an application generates a modified version of the post data that includes a modification to the identified feature. In some embodiments, the application selects terms to edit based on terms detected to match a sensitive-content category generated by the application. In some embodiments, the application generates a modified version of the post data that changes the feature to have a modified feature value.

In the illustrated embodiments, an application analyzes the modified version of the post data for potentially sensitive content using the machine learning classifier. In the illustrated embodiments, an application generates a sensitive data indicator and a confidence value based on the analysis of the modified version of the post. In the illustrated embodiments, an application determines whether the modified feature reduces the risk of exposing sensitive data. For example, in some embodiments, the application determines if the confidence value is lower than the confidence value from analysis of the post data prior to modification, and if the confidence value for the modified post data is lower than the threshold value, then the application recommends the modification to the user. In some embodiments, the modified feature includes a change to terms in the post content, such as replacing or deleting terms. In some embodiments, the modified feature includes a change to the audience of the post.

In some embodiments, if the application is unable to obtain an acceptable confidence score, the application recommends an alternative to editing the post content, for example the application may recommend that user anonymize or delete the post, or may recommend posting to different audience or create new group for the post (e.g., may recommend creating a niche private verified social media group), including providing a list of suggested audiences and associated risk scores, which may include a low-risk social space for verified user contacts that can provide a safe place for the discussion of a sensitive topic.

In the illustrated embodiments, an application issues an alert to the user indicating the potentially sensitive nature of the post and recommends a post modification that changes the feature according to a change that reduced the risk of exposing sensitive information. In the illustrated embodiment, the alert comprises a recommendation for a post modification that changes a feature in the post data identified by the application that contributed to the post data being identified as potentially containing sensitive information. In some embodiments, the application determines whether to alert the user regarding potentially sensitive information based on a preset threshold value for a confidence value, risk value, or other aspect of the post data and the detected potentially sensitive information. In some embodiments, the application determines whether to alert the user regarding potentially sensitive information based on user preferences stored with the user information or otherwise set by the user.

In some embodiments, the application auto-generates alert content presented to the user based on one or more aspects of the evaluation performed according to disclosed embodiments, such as the evaluated post data, the post content containing potentially sensitive information, the category detected to be associated with the post content, and/or a recommendation for a post modification to change a feature in the post data that contributed to the post data being identified as potentially containing sensitive information, such as changing a portion of the post content or change the location of the post so as to change the audience of the post content.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or component that are not shown or described herein, or structures or components different from those shown but for a similar function as described herein may be present without departing the scope of the illustrative embodiments.

Furthermore, the illustrative embodiments are described with respect to specific actual or hypothetical components only as examples. The steps described by the various illustrative embodiments can be adapted for providing explanations for decisions made by a machine-learning classifier model, for example Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, contrastive explanations, computer readable storage medium, high-level features, historical data, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
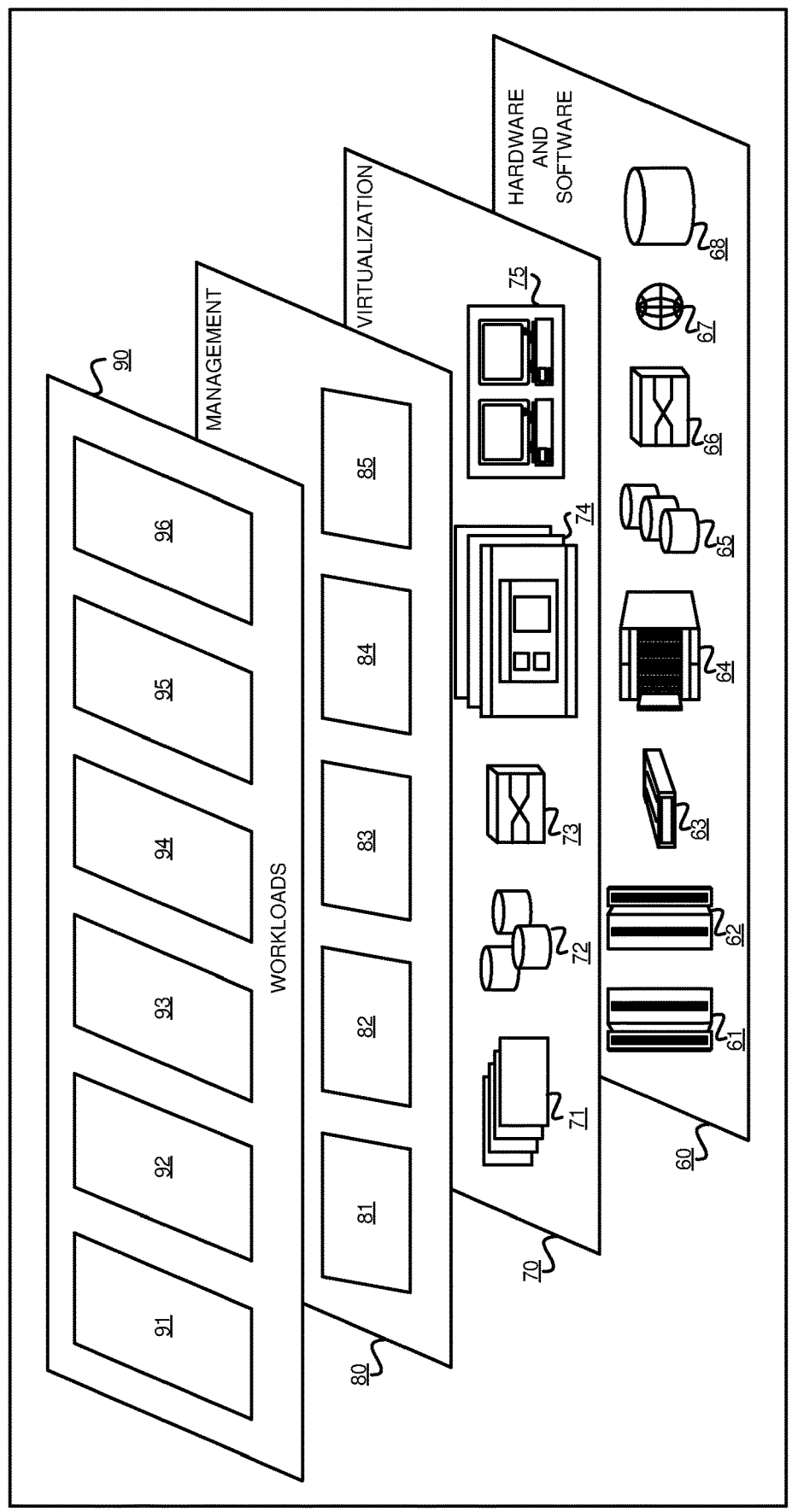
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and sensitive data management 96.

Figure 3:
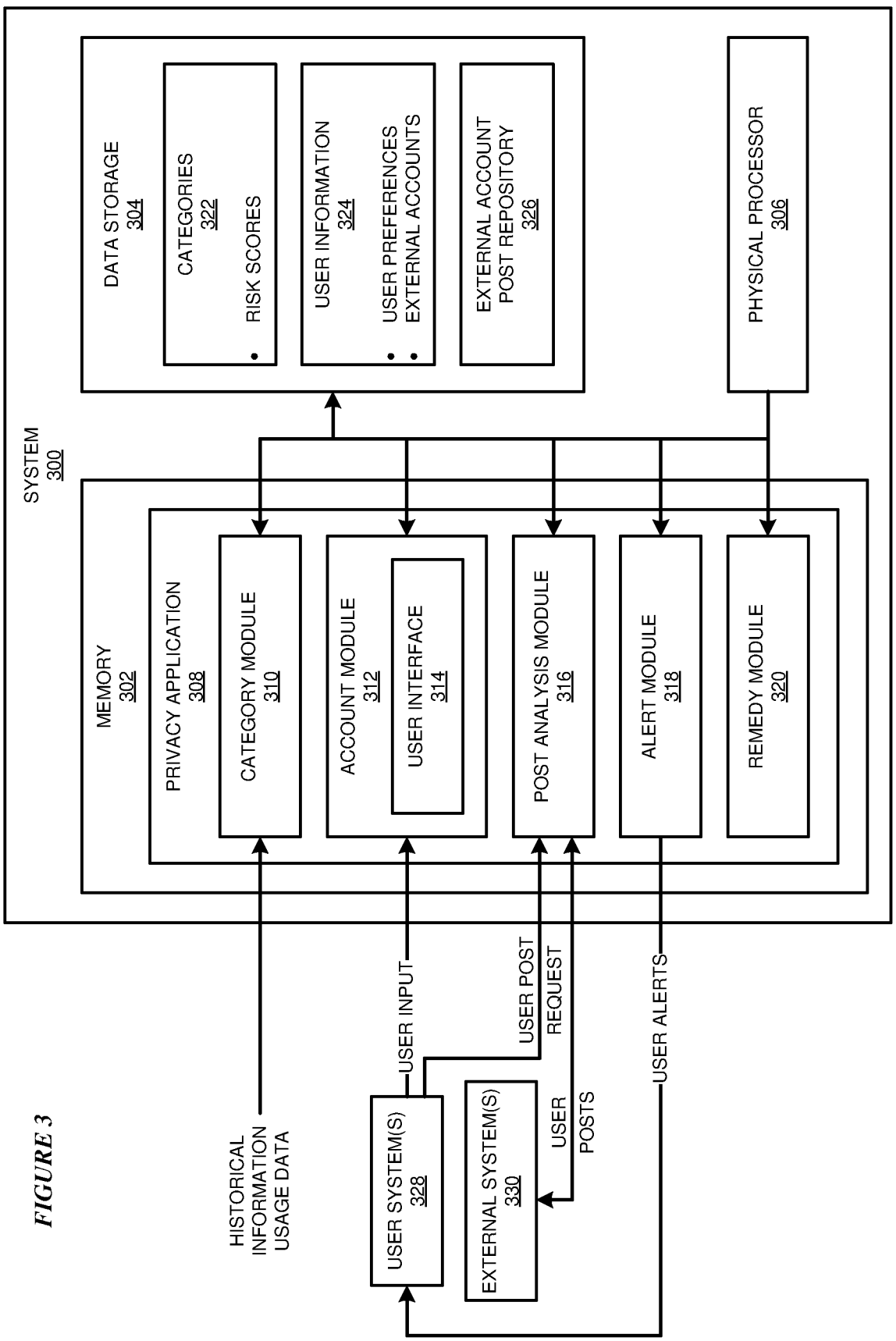
FIG. 3 depicts a block diagram of an example system comprising a privacy application in accordance with an illustrative embodiment.

With reference to FIG. 3, this figure depicts a block diagram of an example system 300 in accordance with an illustrative embodiment. In a particular embodiment, the example system 300 includes a privacy application 308 for recommending post modifications to reduce sensitive data exposure. In some embodiments, the privacy application 308 is deployed in cloud computing environment of FIG. 1, for example in workloads layer 90 of FIG. 2. By way of example, in some embodiments, privacy application 308 is implemented as sensitive data management 96 in FIG. 2.

In the illustrated embodiment, privacy application 308 includes category module 310, an account module 312, a post analysis module 316, an alert module 318, and a remedy module 320. Although illustrated as separate elements, one or more of the modules in FIG. 3 may represent portions of a single module or application.

In the illustrated embodiment, example system 300 includes one or more memory devices, such as memory 302. In the illustrated embodiment, memory 302 generally represents any type or form of volatile or non-volatile storage device or medium capable of storing data and/or computer-readable instructions. In one embodiment, memory 302 stores, loads, and/or maintains privacy application 308.

In the illustrated embodiment, example system 300 also includes one or more physical processors, such as physical processor 306. In the illustrated embodiment, physical processor 306 generally represents any type or form of hardware-implemented processing unit capable of interpreting and/or executing computer-readable instructions. In one embodiment, physical processor 306 access and/or modifies one or more of modules 310-320 of the privacy application 308 stored in memory 302.

In the illustrated embodiment, example system 300 also includes one or more data storage devices, such as data storage device 304. In the illustrated embodiment, data storage device 304 generally represents any type or form of storage device or medium capable of storing data and/or other computer-readable instructions. In the illustrated embodiment, data storage device 304 stores data representative of categories 322, user information 324, and an external-account-post repository 326.

In the illustrated embodiment, the category module 310 defines sensitive data categories, for example contact information, financial information, relationship information, employment information, interests, group affiliation, and travel schedules. In the illustrated embodiment, the category module 310 references historical information-usage data, which comprises publicly known data-abuse events to determine which data categories are most abused.

In an embodiment, the category module 310 considers the prevalence and impact of data-abuse events for different categories to determine an amount of risk associated with disclosure of data in different categories. In an embodiment, the category module 310 generates abuse prevalence values and impact level values for each category based on the data-abuse events related to the various categories. For example, in an embodiment, the abuse prevalence value represents a number of data-abuse events for a given category per number of posts having data in the given category, and the impact level value is based on the consequences of data abuse for data in the given category. In an embodiment, impact levels include the following levels, each of which can be assigned a different numerical value:

Low impact: Individuals may encounter a few minor inconveniences, which they will overcome without any problem (time spent re-entering information, annoyances, irritations, etc.).

Medium impact: Individuals may encounter significant inconveniences, which they will be able to overcome despite a few difficulties (extra costs, denial of access to business services, fear, lack of understanding, stress, minor physical ailments, etc.).

High impact: Individuals may encounter significant consequences, which they should be able to overcome albeit with serious difficulties (misappropriation of funds, blacklisting by financial institutions, property damage, loss of employment, subpoena, worsening of health, etc.).

Very high impact: Individuals may encounter significant, or even irreversible consequences, which they may not overcome (inability to work, long-term psychological or physical ailments, etc.).

In an embodiment, the category module 310 calculates a risk value for each category based on the abuse prevalence value and impact level value for each category. For example, in an embodiment, the category module 310 calculates a weighted average of the abuse prevalence value and impact level value for a category to derive a risk score for that category.

In an embodiment, the category module 310 adjusts the risk values for each category based on the intended audience of a post based on past associations and activities of the audience. For example, a post on a web page that is only accessible to a private group of verified users is less risky than a post on a publicly-accessible web page that anyone can access.

In the illustrated embodiment, the account module 312 performs tasks related to user accounts in response to various events, including user inputs. For example, in some embodiments, the account module 312 creates user accounts in response to user input instructions for new account creation. In an embodiment, "users" may include individuals, organizations, or user-groups. In an embodiment, personal/individual users are able to choose to connect accounts to protect privacy, property, and reputation. In an embodiment, business users (e.g., employee accounts) are able to choose to connect accounts to prevent disclosure of company information in posts.

In some embodiments, the account module 312 includes a user interface 314. In some embodiments, the user interface 314 includes a graphical user interface (GUI) and/or a command line interface. In some embodiments, the user interface 314 allows a user to submit a request for a new account, manage user preferences, manage user account information, and perform other administrative tasks. In some embodiments, the user interface 314 allows a user to submit information associated with the user's social media accounts, such as a URL, a network identifier, a username associated with the user's posts, and user account credentials for external systems 330.

In the illustrated embodiment, the account module 312 collects post data associated with the user from one or more network accessible computer systems, such as external systems 330, identified by the user as hosting the user's social media posts. In some embodiments, the account module 312 connects to the network accessible computer systems using network identifiers and/or URLs received from the user, communicates with the network accessible computer systems using network protocols, such as TCP/IP (Transmission Control Protocol/Internet Protocol), FTP (File Transfer Protocol), or UDP (User Datagram Protocol). In some embodiments, the account module 312 authenticates with the network accessible computer system using user credentials received from the user in order to access and fetch user posts.

In some embodiments, the account module 312 stores the collected post data in the external-account-post repository 326. In some embodiments, the external-account-post repository 326 is stored in a cloud-based database, such as a cloud NoSQL (non-Structured Query Language) service. In alternative embodiments, the external-account-post repository 326 is stored in an on-premise database, which may be a relational or non-relational database. In some embodiments, the post data includes content previously posted on one or more social media websites by the user, reaction counts, and source information indicating a location from where the post was collected, such as a post URL or network identifier.

In the illustrated embodiment, the post analysis module 316 performs tasks related to evaluating a user's posts to determine whether the posts convey potentially sensitive information. For example, in some embodiments, the post analysis module 316 evaluates post data stored in the external-account-post repository 326.

In some embodiments, the post analysis module 316 evaluates post data received with a user post request from a user system 328 prior to the post data being posted on a social media site. In some such embodiments, the user post request includes an HTTP request from a user system 328 as a client device to an external system 330, where the request includes post data describing post content to post on a web page hosted by the external system. In some such embodiments, the post analysis module 316 recognizes the HTTP request being directed to an external system 330 submitted by the user as being associated with the user's social media accounts, for example based on a the HTTP request including a URL, a network identifier, a username, and/or user account credentials that match a URL, network identifier, username, and/or user account credential for an external systems 330 that was previously submitted by the user. In some embodiments, the post analysis module 316 serves as a proxy, web browser plugin, an application on a computing device, such as a desktop computer, tablet, or smart phone, or a module of an application on a desktop computer, tablet, or smart phone, allowing the post analysis module 316 to evaluate the post data in route to the external system 330. In some embodiments, if the post analysis module 316 does not detect potentially sensitive information in the post data, the post analysis module 316 releases the post data to the external system 330 for posting; if the post analysis module 316 detects potentially sensitive information in the post data, the post analysis module 316 interrupts the transmission of the post data to the external system 330 in order to alert the user to the potentially sensitive content detected in the post data.

In some embodiments, the post analysis module 316 evaluates post data that includes data representative of post content authored by a user and associates the post data with a category from the predefined list of categories 322 in data storage device 304 having a strongest correlation with the post content based on the post content. In some embodiments, the post analysis module 316 searches external-account-post repository 326 for user posts that correspond with one or more of the categories 322, and flags posts that contain sensitive terms (entities) and the location of original post. In some embodiments, the post analysis module 316 evaluates a variety of different types of posts, including user reviews (e.g., product reviews), reactions (e.g., "Likes" or "Favorites" types of reactions to some content indicating an approval or belief in that content), gestures (e.g., "Nodding" in video in response to what is being said in the video indicating an approval or belief in what is being said), online reviews, discussions, comments, and blogs. In some embodiments, the post analysis module 316 evaluates a variety of different formats of posts, such as text (e.g., blog post about recent conference), speech (e.g., review submitted through a virtual assistant), images, and video (e.g., photo posted of specific car model may suggest the user is the owner of that model). In some embodiments, non-text posts are converted to text using available conversion technology, e.g., image recognition processing for images and video or speech-to-text processing for audio.

In some embodiments, the post analysis module 316 analyzes the post data for potentially sensitive content using a machine learning classifier. In some embodiments, the post analysis module 316 trains the machine learning classifier with sensitive and non-sensitive entities to predict sensitive data values. In some embodiments, the classification models can be used to identify sensitive entities for classifications such as Employment status, Income level, Marital status, Parent status, etc.

In some embodiments, the post analysis module 316 performs semantics processing to enhance text categorization by considering context of the text. In some embodiments, the post analysis module 316 performs tone analysis to identify emotions associated with a post, such as posts expressing negative emotions that a user may not want to share, for example anger, disgust, or disappointment. In some embodiments, the post analysis module 316 performs contentiousness analysis to identify posts that convey controversial topics by searching for posts having highly variant reactions, such as both a large number of "likes" or other indications of agreement from other users, and a large number of "dislikes" or other indications of disagreement from other users.

In some embodiments, the post analysis module 316 combines posts having similar content, such as a common or synonymous terms, and evaluates the combined post data. In some such embodiments, the post analysis module 316 collects a first portion of the post content from a first network accessible computer system and collects a second portion of the post content from a second network accessible computer system.

In some embodiments, the post analysis module 316 generates a sensitive data indicator and a confidence value associated with the post data based on the results of the machine learning classifier. The sensitive data indicator identifies the post data as potentially containing sensitive information, and the confidence value represents a degree of certainty with which the machine learning classifier determined that the post data contains sensitive information.

In some embodiments, the post analysis module 316 generates explanatory data associated with the sensitive data indicator of the post data. The explanatory data identifies one or more features of the post data that most strongly contributed to the results from the machine learning classifier. For example, in some embodiments, the feature is representative of a portion of the post content or a property of an intended audience of the post content when posted. In some embodiments, explanation algorithms can be used to determine features that caused classifier to predict sensitive category/classification (e.g., using open source libraries such as LIME or SHAP).

In the illustrated embodiment, the alert module 318 performs tasks related to issuing an alert to the user indicating that the post data potentially contains sensitive data. In some embodiments, the alert comprises a recommendation for a post modification that changes a feature in the post data identified by the remedy module 320 that contributed to the post data being identified as potentially containing sensitive information. In some embodiments, the alert module 318 determines whether to alert the user regarding potentially sensitive information detected by the post analysis module 316 based on a preset threshold value for a confidence value, risk value, or other aspect of the post data and the detected potentially sensitive information. In some embodiments, the alert module 318 determines whether to alert the user regarding potentially sensitive information detected by the post analysis module 316 based on user preferences stored with the user information 324 or otherwise set by the user via the account module 312.

In some embodiments, the alert module 318 auto-generates alert content presented to the user based on one or more aspects of the evaluation performed by the post analysis module 316 and/or remedy module 320, such as the evaluated post data, the post content containing potentially sensitive information, the category detected to be associated with the post content, and/or a recommendation for a post modification to change a feature in the post data that contributed to the post data being identified as potentially containing sensitive information, such as changing a portion of the post content or change the location of the post so as to change the audience of the post content.

In the illustrated embodiment, the remedy module 320 performs tasks related to generating recommended edits by removing different combinations of terms from post content and recalculating the confidence score for the post data for each modified version of the post data until an acceptable score is achieved. In some embodiments, an acceptable confidence score is a confidence score that is below a threshold value preset by the privacy application 308 or by the user as part of the user preferences stored with the user information 324. In some embodiments, the remedy module 320 selects terms to edit based on terms detected to match a category by the category module 310.

In some embodiments, the remedy module 320 generates a modified version of the post data that changes the feature to have a modified feature value. In some such embodiments, the remedy module 320 analyses the modified version of the post data for potentially sensitive content using a machine learning classifier. In some embodiments, the remedy module 320 transmits the modified version of the post data to the post analysis module 316 for analysis of the modified version of the post data. In some such embodiments, in response to the analysis of the modified version of the post data, the remedy module 320 generates a sensitive data indicator associated with the modified version of the post data and second confidence value representing a degree of certainty that the modified version of the post data contains sensitive information. If the confidence value is lower than the confidence value from analysis of the post data prior to modification, and if the confidence value for the modified post data is lower than the threshold value, then the remedy module 320 recommends the modification to the user. In some embodiments, the modified feature includes a change to terms in the post content, such as replacing or deleting terms. In some embodiments, the modified feature includes a change to the audience of the post.

In some embodiments, if the remedy module 320 is unable to obtain an acceptable confidence score, the remedy module 320 recommends an alternative to editing the post content, for example the remedy module 320 may recommend that user anonymize or delete the post, or may recommend posting to different audience or create new group for the post (e.g., may recommend creating a niche private verified social media group), including providing a list of suggested audiences and associated risk scores, which may include a low-risk social space for verified user contacts that can provide a safe place for the discussion of a sensitive topic.

Figure 4:
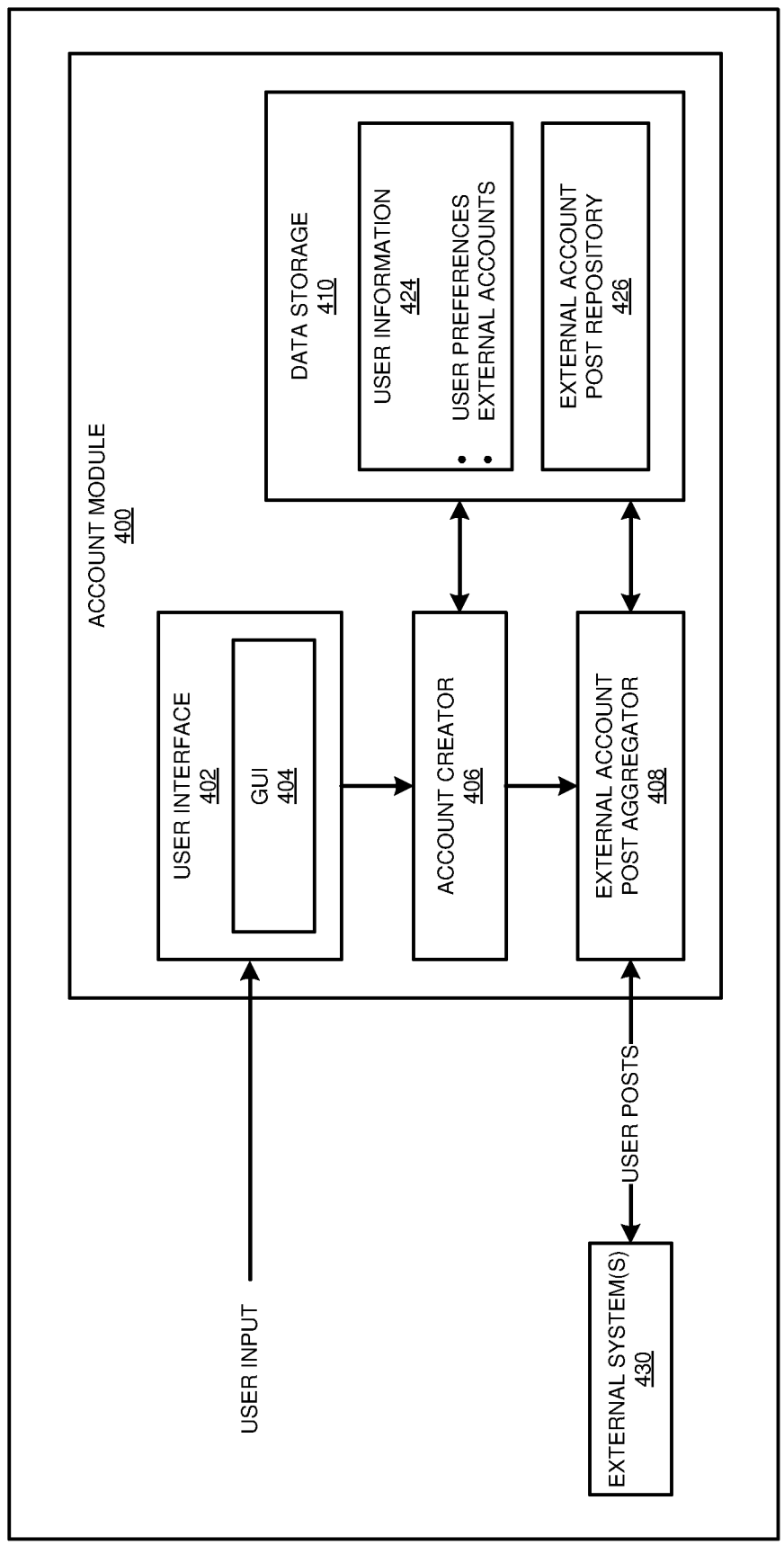
FIG. 4 depicts a block diagram of an account module in accordance with an illustrative embodiment.

With reference to FIG. 4, this figure depicts a block diagram of an account module 400 in accordance with an illustrative embodiment. In a particular embodiment, the account module 400 is an example of account module 312 of FIG. 3.

In the illustrated embodiment, the account module 400 performs tasks related to user accounts in response to various events, including user inputs. For example, in some embodiments, the account module 400 creates user accounts in response to user input instructions for new account creation. In an embodiment, "users" may include individuals, organizations, or user-groups. In an embodiment, personal/individual users are able to choose to connect accounts to protect privacy, property, and reputation. In an embodiment, business users (e.g., employee accounts) are able to choose to connect accounts to prevent disclosure of company information in posts. In some embodiments, the account module 400 includes a user interface 402, an account creator 406, and an external account post aggregator 408. Although illustrated as separate elements, one or more of the user interface 402, account creator 406, and external account post aggregator 408 in FIG. 4 may represent portions of a single module or application.

In some embodiments, the account module 400 includes a user interface 402. In some embodiments, the user interface 402 includes a graphical user interface (GUI) 404. In alternative embodiments, the user interface 402 includes a command line interface. In some embodiments, the user interface 402 receives user inputs representative of user requests to request a new account, manage user preferences, manage user account information, and perform other administrative tasks. The user interface 402 forwards such requests to account creator 406. The account creator 406 includes logic to respond to user requests to create a new account, manage user preferences, manage user account information, and perform other administrative tasks. The account creator 406 stores, accesses, and modifies user information 424 received from the user in data storage 410 according to user inputs. In some embodiments, the user interface 314 allows a user to submit information associated with the user's social media accounts, such as a URL, a network identifier, a username associated with the user's posts, and user account credentials for external systems 430. The account creator 406 stores the received information associated with the user's social media accounts, such as a URL, a network identifier, a username associated with the user's posts, and user account credentials for external systems 430 with user information 424 in data storage 410.

In the illustrated embodiment, the account module 400 includes an external account post aggregator 408. In some embodiments, the external account post aggregator 408 collects post data associated with the user from one or more network accessible computer systems, such as external systems 430, identified by the user as hosting the user's social media posts. In some embodiments, the external account post aggregator 408 connects to the network accessible computer systems using network identifiers and/or URLs received from the user, communicates with the network accessible computer systems using network protocols, such as TCP/IP, FTP, or UDP. In some embodiments, the external account post aggregator 408 authenticates with the network accessible computer system using user credentials received from the user in order to access and fetch user posts.

In some embodiments, the external account post aggregator 408 stores the collected post data in the external-account-post repository 426. In some embodiments, the external-account-post repository 426 is stored in a cloud-based database, such as a cloud NoSQL service. In alternative embodiments, the external-account-post repository 426 is stored in an on-premise database, which may be a relational or non-relational database. In some embodiments, the post data includes content previously posted on one or more social media websites by the user, reaction counts, and source information indicating a location from where the post was collected, such as a post URL or network identifier.

Figure 5:
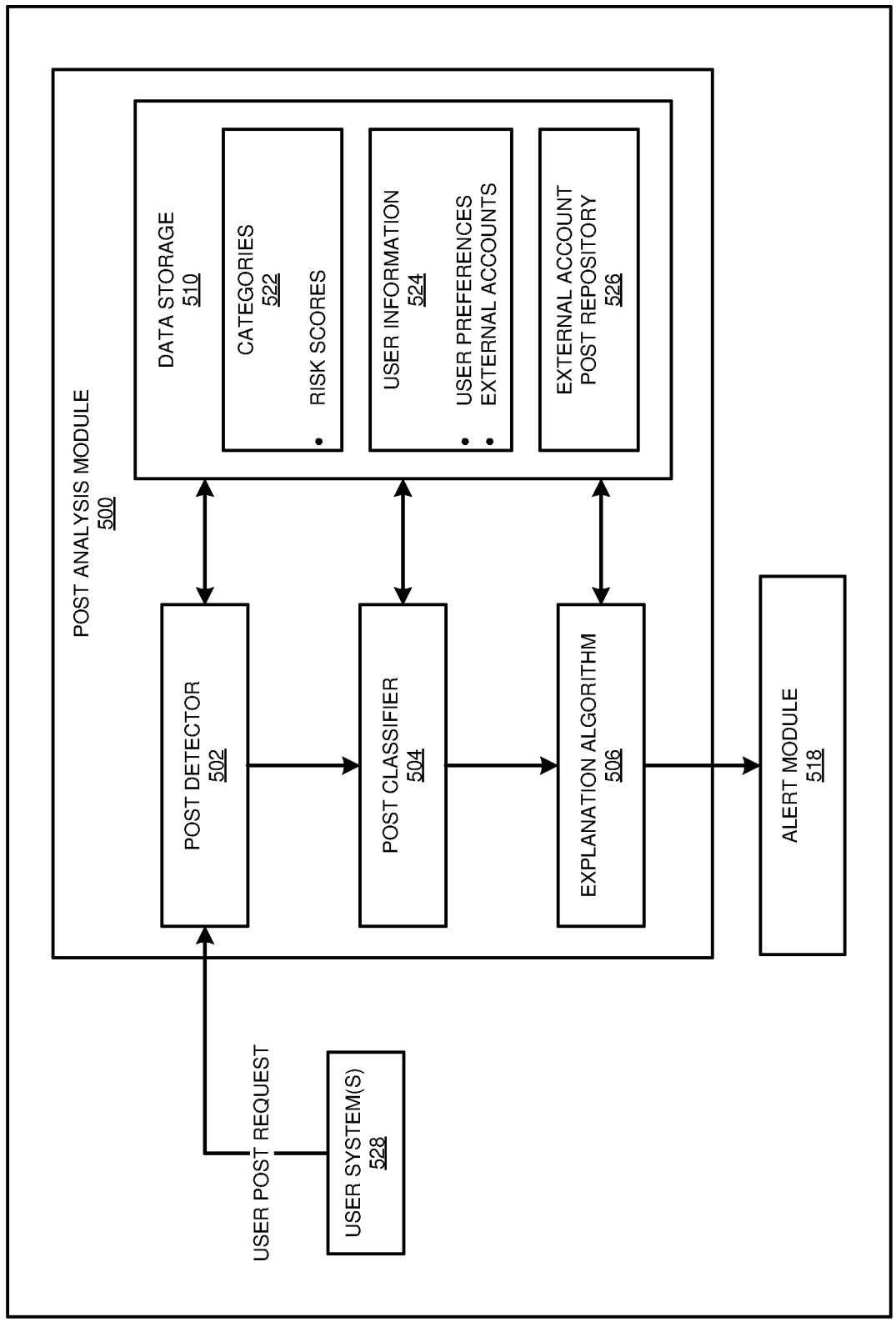
FIG. 5 depicts a block diagram of a post analysis module in accordance with an illustrative embodiment.

With reference to FIG. 5, this figure depicts a block diagram of a post analysis module 500 in accordance with an illustrative embodiment. In a particular embodiment, the post analysis module 500 is an example of post analysis module 316 of FIG. 3.

In the illustrated embodiment, the post analysis module 500 performs tasks related to evaluating a user's posts to determine whether the posts convey potentially sensitive information. For example, in some embodiments, the post analysis module 500 evaluates post data stored in the external-account-post repository 526 of data storage 510. In some embodiments, the post analysis module 500 includes a post detector 502, a post classifier 504, and an explanation algorithm module 506. Although illustrated as separate elements, one or more of the post detector 502, post classifier 504, and explanation algorithm module 506 in FIG. 5 may represent portions of a single module or application.

In some embodiments, the post detector 502 evaluates post data received with a user post request from a user system 528 prior to the post data being posted on a social media site. In some such embodiments, the user post request includes an HTTP request from a user system 528 as a client device to an external system (such as external system 330 of FIG. 3), where the request includes post data describing post content to post on a web page hosted by the external system. In some such embodiments, the post detector 502 recognizes the HTTP request being directed to an external system 330 submitted by the user as being associated with the user's social media accounts, for example based on a the HTTP request including a URL, a network identifier, a username, and/or user account credentials that match a URL, network identifier, username, and/or user account credential for an external systems 330 that was previously submitted by the user and stored with user information 524. In some embodiments, the post detector 502 serves as a proxy, web browser plugin, an application on a computing device, such as a desktop computer, tablet, or smart phone, or a module of an application on a desktop computer, tablet, or smart phone, allowing the post detector 502 to evaluate the post data in route to the external system 330. In some embodiments, if the post detector 502 does not detect potentially sensitive information in the post data, the post detector 502 releases the post data to the external system 330 for posting; if the post detector 502 detects potentially sensitive information in the post data, the post detector 502 interrupts the transmission of the post data to the external system 330 in order to alert the user to the potentially sensitive content detected in the post data.

In some embodiments, the post detector 502 evaluates post data that includes data representative of post content authored by a user and associates the post data with a category from the predefined list of categories 522 in data storage 510 having a strongest correlation with the post content based on the post content. In some embodiments, the post detector 502 searches external-account-post repository 326 for user posts that correspond with one or more of the categories 522, and flags posts that contain sensitive terms (entities) and the location of original post. In some embodiments, the post detector 502 evaluates a variety of different types of posts, including user reviews (e.g., product reviews), reactions (e.g., "Likes" or "Favorites" types of reactions to some content indicating an approval or belief in that content), gestures (e.g., "Nodding" in video in response to what is being said in the video indicating an approval or belief in what is being said), online reviews, discussions, comments, and blogs. In some embodiments, the post detector 502 evaluates a variety of different formats of posts, such as text (e.g., blog post about recent conference), speech (e.g., review submitted through a virtual assistant), images, and video (e.g., photo posted of specific car model may suggest the user is the owner of that model). In some embodiments, non-text posts are converted to text using available conversion technology, e.g., image recognition processing for images and video or speech-to-text processing for audio.

In some embodiments, if the post detector 502 detects post data having content associates a category from the predefined list of categories 522, the post data is provided to the post classifier 504. In some embodiments, the post classifier 504 analyzes the post data for potentially sensitive content using a machine learning classifier. In some embodiments, the post classifier 504 trains the machine learning classifier with sensitive and non-sensitive entities to predict sensitive data values. In some embodiments, the classification models can be used to identify sensitive entities for classifications such as Employment status, Income level, Marital status, Parent status, etc.

In some embodiments, the post classifier 504 performs semantics processing to enhance text categorization by considering context of the text. In some embodiments, the post classifier 504 performs tone analysis to identify emotions associated with a post, such as posts expressing negative emotions that a user may not want to share, for example anger, disgust, or disappointment. In some embodiments, the post classifier 504 performs contentiousness analysis to identify posts that convey controversial topics by searching for posts having highly variant reactions, such as both a large number of "likes" or other indications of agreement from other users, and a large number of "dislikes" or other indications of disagreement from other users.

In some embodiments, the post classifier 504 combines posts having similar content, such as a common or synonymous terms, and evaluates the combined post data. In some such embodiments, the post classifier 504 collects a first portion of the post content from a first network accessible computer system and collects a second portion of the post content from a second network accessible computer system.

In some embodiments, the post classifier 504 generates a sensitive data indicator and a confidence value associated with the post data based on the results of the machine learning classifier. The sensitive data indicator identifies the post data as potentially containing sensitive information, and the confidence value represents a degree of certainty with which the machine learning classifier determined that the post data contains sensitive information.

In some embodiments, post classifier 504 forwards the results of the analysis and the analyzed post data to the explanation algorithm module 506. In some embodiments, the explanation algorithm module 506 generates explanatory data associated with the sensitive data indicator of the post data, which is forwarded to an alert module 518 for generating a notice to the user. The explanatory data identifies one or more features of the post data that most strongly contributed to the results from the machine learning classifier. For example, in some embodiments, the feature is representative of a portion of the post content or a property of an intended audience of the post content when posted. In some embodiments, explanation algorithms can be used to determine features that caused classifier to predict sensitive category/classification (e.g., using open source libraries such as LIME or SHAP).

Figure 6:
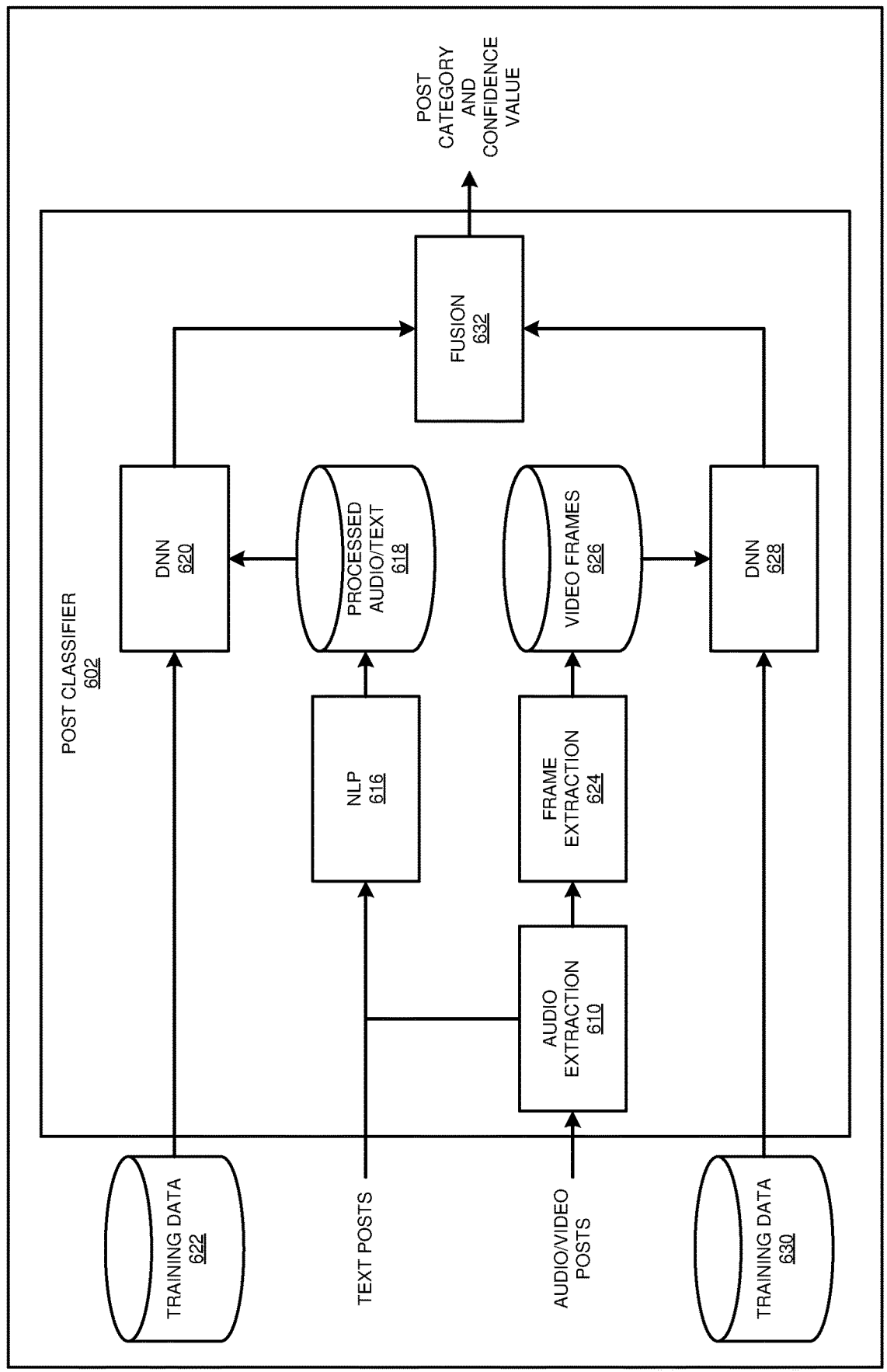
FIG. 6 depicts a block diagram of a post classifier in accordance with an illustrative embodiment.

With reference to FIG. 6, this figure depicts a block diagram of a post classifier 602 in accordance with an illustrative embodiment. In a particular embodiment, the post classifier 602 is an example of post classifier 504 of FIG. 5.

In the illustrative embodiment, the post classifier 602 includes an audio extraction module 610 for receiving combined audio/video posts or video posts and a Natural language processing (NLP) module 616 for receiving audio posts or text posts. The audio extraction module 610 separates the audio signals from the video signals, if present, or if no audio is present, simply allows the video signal to continue to the frame extraction unit 624. In an embodiment, the audio extraction module 610 outputs the audio to the NLP module 616.

In an embodiment, the NLP module 616 applies speech-to-text NLP algorithms to generate a text transcription of the incoming audio. In some embodiments, NLP module 616 stores the transcription in the processed audio memory 618. In an embodiment, a Deep Neural Network (DNN) 620 receives the transcription from the memory 618 and applies machine learning algorithms to extract grammatical features of the dialogue (e.g., to identify tone, sentiment, etc.), eliminate noise, identify references to topics related to various types of sensitive information, and output a classification indicating whether the post include sensitive information and a confidence score indicative of a degree of certainty the DNN has in the classification output. In an embodiment, the DNN 620 is trained using training data 622 from public databases, a pretrained model, and/or historical data representative of sensitive and non-sensitive entities to predict sensitive data values, including historical information-usage data, which comprises publicly known data-abuse events to determine which data categories are most abused. In some embodiments, the classification models can be used to identify sensitive entities for classifications such as Employment status, Income level, Marital status, Parent status, etc.

In an embodiment, the audio extraction module 610 outputs the video signal to a frame extraction unit 624. The frame extraction unit 624 extracts and groups frames of the video signal for processing, and then stores the frames in a video frames memory 626. In an embodiment, a DNN 628 receives and processes groups of frames for image classification, and generates an indication of a potential emergency based on the prediction made by the internal classifier model in response to the input frames. In an embodiment, the DNN 628 includes a Convolutional Neural Network (CNN) or multiple DNNs. During the configuration process, the detection system uses training data 630 to train the DNN using labelled images depicting sensitive and non-sensitive entities, including historical information-usage data that comprises publicly known data-abuse events to determine which data categories are most abused. The training data 630 is used to train the classification model of the DNN 628 to classify images so as to predict sensitive imagery, such as images depicting sensitive entities for classifications such as Employment status, Income level, Marital status, Parent status, etc. In some embodiments, the post classifier 602 includes a fusion unit 632 used for combined audio/video posts to align the processed audio and video and generate a combined score indicative of the likelihood of the audio/video signal being a recording of potentially sensitive information based on the individual audio and video classification results and confidence scores.

Figure 7:
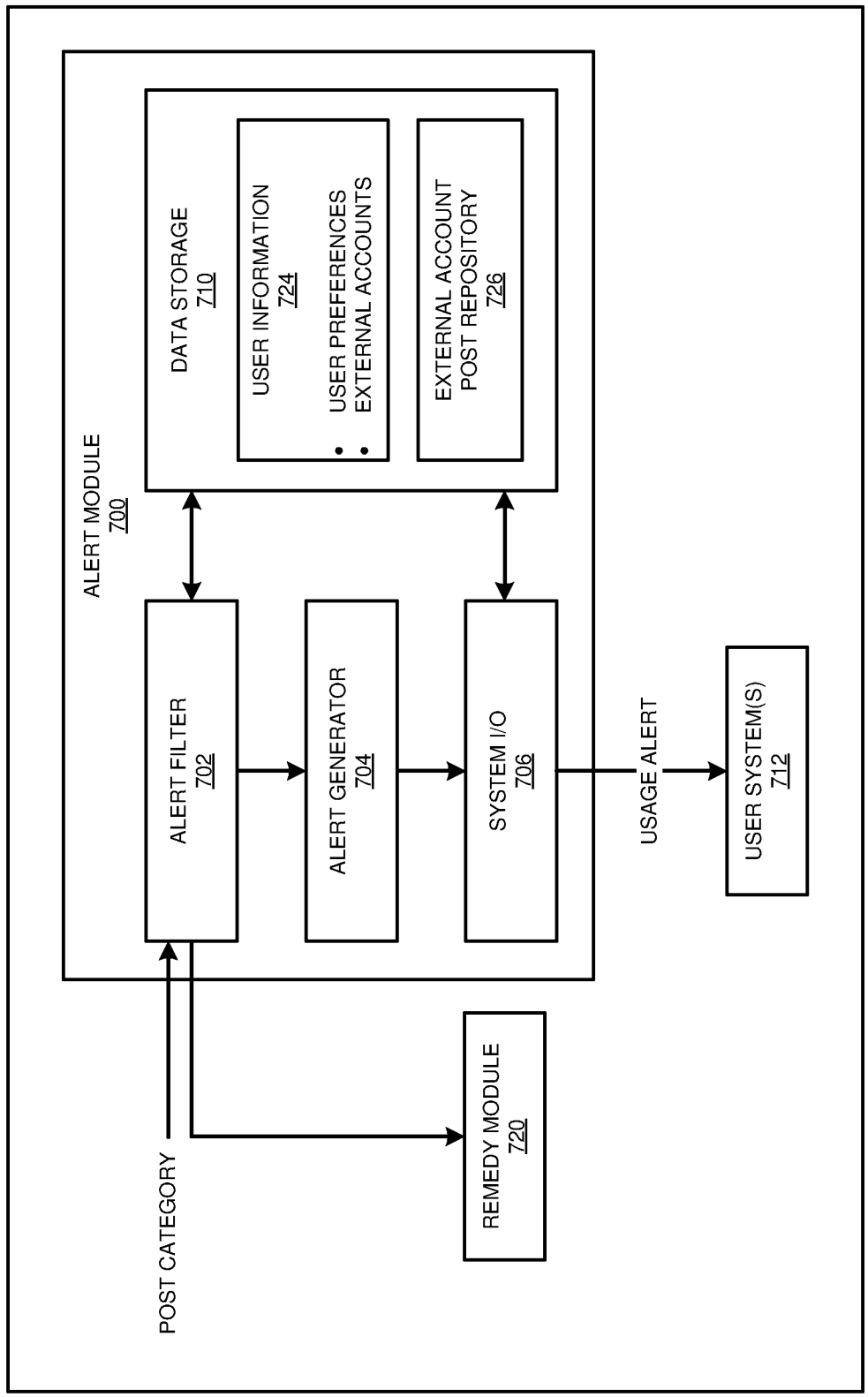
FIG. 7 depicts a block diagram of an alert module in accordance with an illustrative embodiment.

With reference to FIG. 7, this figure depicts a block diagram of an alert module 700 in accordance with an illustrative embodiment. In a particular embodiment, the alert module 700 is an example of alert module 318 of FIG. 3.

In some embodiments, the alert module 700 includes an alert filter 702, an alert generator 704, and a system I/O device 706. Although illustrated as separate elements, one or more of the alert filter 702, alert generator 704, and system input/output (I/O) device 706 in FIG. 7 may represent portions of a single module or application.

In the illustrated embodiment, the alert module 700 performs tasks related to issuing an alert to the user indicating that the post data potentially contains sensitive data, where the post data includes post data stored in external-account-post repository 726 in data storage 710, or post data in a post request prior to the post content being posted. In some embodiments, the alert comprises a recommendation for a post modification that changes a feature in the post data and identified by the remedy module 720 (e.g., where remedy module is an example of remedy module 320 of FIG. 3) corresponding to remedy module 320 of FIG. 3) that contributed to the post data being identified as potentially containing sensitive information.

In some embodiments, the alert filter 702 determines whether to alert the user about a post by detecting whether post data corresponding to the post has been associated with a category from the predefined list of sensitive-information categories by category module 310 of FIG. 3. In some embodiments, the alert filter 702 determines whether to alert the user about a post by detecting whether post data corresponding to the post has been given a confidence value by post analysis module 316 of FIG. 3 that exceeds a preset threshold value for a confidence value, risk value, or other aspect of the post data and the detected potentially sensitive information. In some embodiments, the alert filter 702 determines whether to alert the user regarding potentially sensitive information detected by the post analysis module 316 based on user preferences stored with the user information 724 or otherwise set by the user via the account module 312 of FIG. 3.

In some embodiments, if the alert filter 702 has determined to alert the user about a post regarding potentially sensitive information in the post content, the alert filter 702 signals the alert generator 704 with the post data. In some embodiments, the alert generator 704 auto-generates alert content presented to the user based on one or more aspects of the evaluation performed by the post analysis module 316 and/or remedy module 320, such as the evaluated post data, the post content containing potentially sensitive information, the category detected to be associated with the post content, and/or a recommendation for a post modification to change a feature in the post data that contributed to the post data being identified as potentially containing sensitive information, such as changing a portion of the post content or change the location of the post so as to change the audience of the post content. The system I/O device 706 is then used to transmit the alert content to one or more user systems 712 according to user preferences in user information 724.

Figure 8:
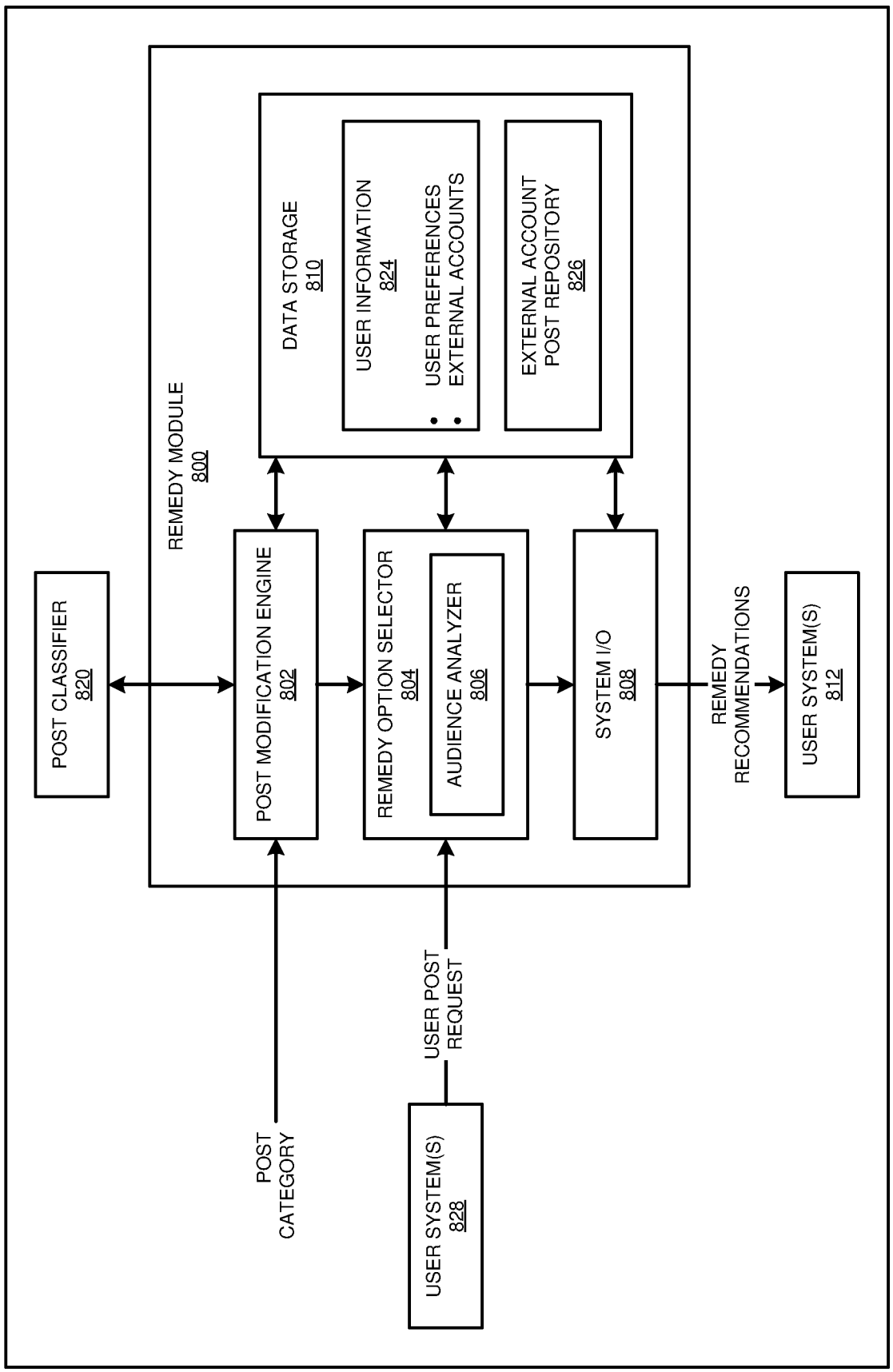
FIG. 8 depicts a block diagram of a remedy module in accordance with an illustrative embodiment.

With reference to FIG. 8, this figure depicts a block diagram of a remedy module 800 in accordance with an illustrative embodiment. In a particular embodiment, the remedy module 800 is an example of remedy module 320 of FIG. 3.

In some embodiments, the remedy module 800 includes a post modification engine 802, a remedy option selector 804 having an audience analyzer 806, and a system I/O device 808. Although illustrated as separate elements, one or more of the post modification engine 802, remedy option selector 804, audience analyzer 806, and system I/O device 808 in FIG. 8 may represent portions of a single module or application.

In the illustrated embodiment, the remedy module 800 performs tasks related to generating recommended edits by removing different combinations of terms from post content and recalculating the confidence score for the post data for each modified version of the post data until an acceptable score is achieved. In some embodiments, an acceptable confidence score is a confidence score that is below a threshold value preset by the privacy application 308 of FIG. 3 or by the user as part of the user preferences stored with the user information 824 in data storage 810. In some embodiments, the remedy module 800 selects terms to edit based on terms detected to match a category by the category module 310 of FIG. 3.

In some embodiments, the post modification engine 802 generates a modified version of the post data that changes the feature to have a modified feature value. In some such embodiments, the post modification engine 802 transmits modified versions of the post to post classifier 820, which is an example of post classifier 602 of FIG. 6, and which analyses the modified version of the post data for potentially sensitive content using a machine learning classifier. In some such embodiments, in response to the analysis of the modified version of the post data, the post classifier 820 generates a sensitive data indicator associated with the modified version of the post data and second confidence value representing a degree of certainty that the modified version of the post data contains sensitive information. If the confidence value is lower than the confidence value from analysis of the post data prior to modification, and the confidence value for the modified post data is lower than the threshold value, then the remedy module 800 recommends the modification to the user, either directly to user systems 812 via system I/O device 808 according to user preferences in user information 824, or via an alert module, such as alert module 318 of FIG. 3. In some embodiments, the remedy module 800 stores the modified post in the external-account-post repository 826 associated with the original post, and alerts the user to the presence of recommended changes that the user can review by accessing the modified post in the external-account-post repository 826. In some embodiments, the modified feature includes a change to terms in the post content, such as replacing or deleting terms.

In some embodiments, the post is analyzed by remedy option selector 804, which includes an audience analyzer 806 that may recommend, as the modified feature, a change to the audience of the post. In some embodiments, the remedy option selector 804 analyses a user post request, received from user system(s) 828, in parallel with other processing, such as processing by post analysis module 316, in order to expedite processing for such post requests to avoid delays while the user is trying to post content. In some embodiments, the remedy option selector 804 recognizes the post data as post data to be processed based on matching a destination URL, a destination network identifier, a username associated with the post request, or user account credentials associated with the post request matching user information 824.

In some embodiments, if the post modification engine 802 is unable to obtain an acceptable confidence score through multiple iterations of modifying and analyzing the post content, the remedy option selector 804 recommends an alternative to editing the post content. For example, in some embodiments, the remedy option selector 804 recommends that user anonymize or delete the post, or may recommend posting to different audience or create new group for the post (e.g., may recommend creating a niche private verified social media group), including providing a list of suggested audiences and associated risk scores, which may include a low-risk social space for verified user contacts that can provide a safe place for the discussion of a sensitive topic.

Figure 9:
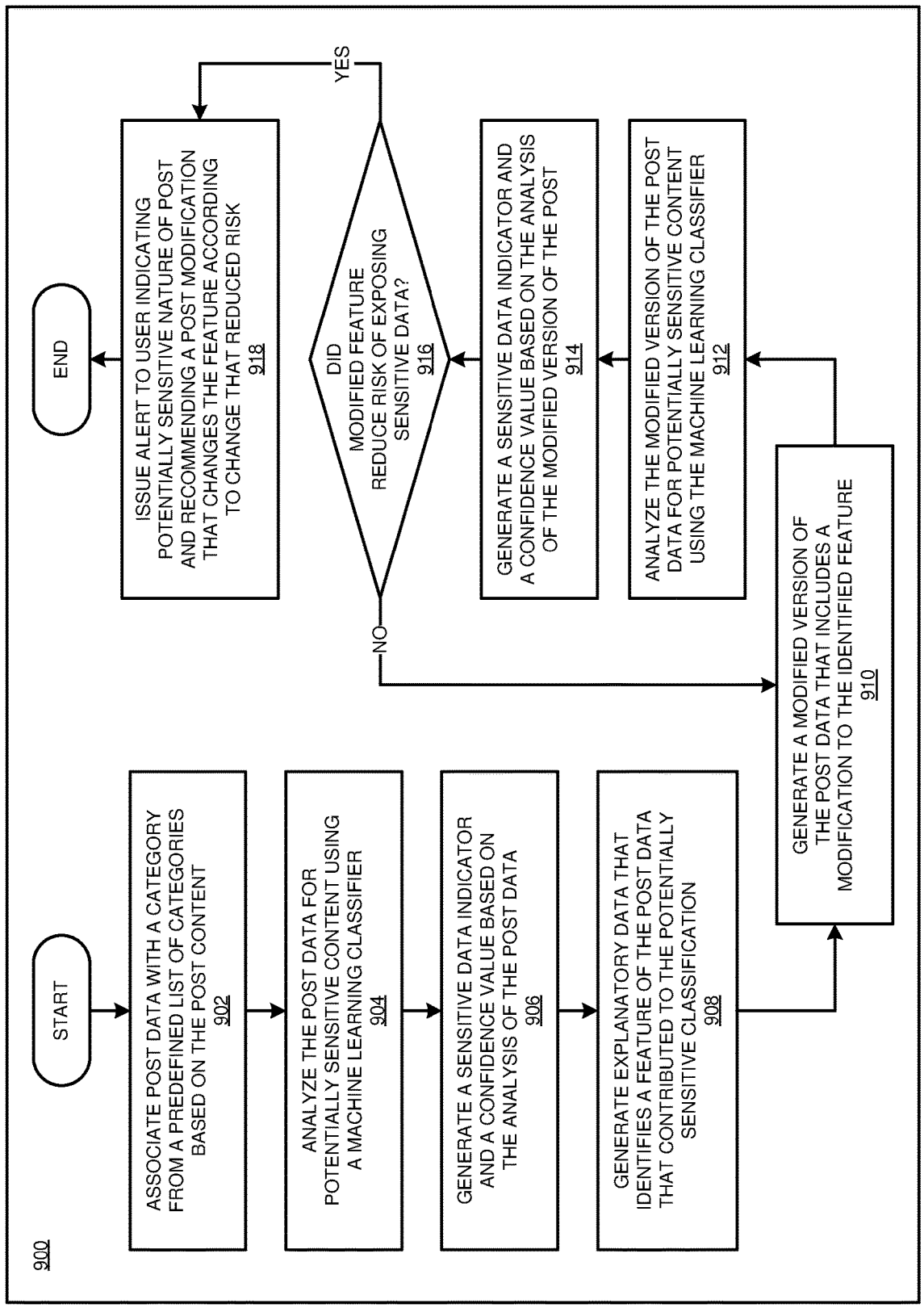
FIG. 9 depicts a flowchart of an example process for recommending post modifications to reduce sensitive data exposure in accordance with an illustrative embodiment.

With reference to FIG. 9 this figure depicts recommending post modifications to reduce sensitive data exposure in accordance with an illustrative embodiment. In a particular embodiment, the privacy application 308 of FIG. 3 carries out the process 900.

In the illustrated embodiment, at block 902, the application associates post data with a category from a predefined list of categories based on the post content. For example, in some embodiments, the application defines sensitive data categories, for example contact information, financial information, relationship information, employment information, interests, group affiliation, and travel schedules. In some embodiments, the application references historical information-usage data, which comprises publicly known data-abuse events to determine which data categories are most abused. In some embodiments, the application considers the prevalence and impact of data-abuse events for different categories to determine an amount of risk associated with disclosure of data in different categories. In some embodiments, the application generates abuse prevalence values and impact level values for each category based on the data-abuse events related to the various categories. For example, in an embodiment, the abuse prevalence value represents a number of data-abuse events for a given category per number of posts having data in the given category, and the impact level value is based on the consequences of data abuse for data in the given category. In an embodiment, impact levels include the following levels, each of which can be assigned a different numerical value:

Low impact: Individuals may encounter a few minor inconveniences, which they will overcome without any problem (time spent re-entering information, annoyances, irritations, etc.).

Medium impact: Individuals may encounter significant inconveniences, which they will be able to overcome despite a few difficulties (extra costs, denial of access to business services, fear, lack of understanding, stress, minor physical ailments, etc.).

High impact: Individuals may encounter significant consequences, which they should be able to overcome albeit with serious difficulties (misappropriation of funds, blacklisting by financial institutions, property damage, loss of employment, subpoena, worsening of health, etc.).

Very high impact: Individuals may encounter significant, or even irreversible consequences, which they may not overcome (inability to work, long-term psychological or physical ailments, etc.).

In some embodiments, the application calculates a risk value for each category based on the abuse prevalence value and impact level value for each category. For example, in an embodiment, the application calculates a weighted average of the abuse prevalence value and impact level value for a category to derive a risk score for that category.

In an embodiment, the application adjusts the risk values for each category based on the intended audience of a post based on past associations and activities of the audience. For example, a post on a web page that is only accessible to a private group of verified users is less risky than a post on a publicly-accessible web page that anyone can access.

For example, in some embodiments, the application evaluates post data stored in an external-account-post repository. In some embodiments, the application evaluates post data received with a user post request from a user system prior to the post data being posted on a social media site. In some such embodiments, the user post request includes an HTTP request from a user system as a client device to an external system, where the request includes post data describing post content to post on a web page hosted by the external system. In some such embodiments, the application recognizes the HTTP request being directed to an external system submitted by the user as being associated with the user's social media accounts, for example based on a the HTTP request including a URL, a network identifier, a username, and/or user account credentials that match a URL, network identifier, username, and/or user account credential for an external systems that was previously submitted by the user. In some embodiments, the application serves as a proxy, web browser plugin, an application on a computing device, such as a desktop computer, tablet, or smart phone, or a module of an application on a desktop computer, tablet, or smart phone, allowing the application to evaluate the post data in route to the external system. In some embodiments, if the application does not detect potentially sensitive information in the post data, the application releases the post data to the external system for posting; if the application detects potentially sensitive information in the post data, the application interrupts the transmission of the post data to the external system in order to alert the user to the potentially sensitive content detected in the post data.

Thus, n some embodiments, at block 902 the application evaluates post data that includes data representative of post content authored by a user and associates the post data with a category from the predefined list of categories in data storage having a strongest correlation with the post content based on the post content. In some embodiments, the application searches an external-account-post repository for user posts that correspond with one or more of the categories, and flags posts that contain sensitive terms (entities) and the location of original post. In some embodiments, the application evaluates a variety of different types of posts, including user reviews (e.g., product reviews), reactions (e.g., "Likes" or "Favorites" types of reactions to some content indicating an approval or belief in that content), gestures (e.g., "Nodding" in video in response to what is being said in the video indicating an approval or belief in what is being said), online reviews, discussions, comments, and blogs. In some embodiments, the application evaluates a variety of different formats of posts, such as text (e.g., blog post about recent conference), speech (e.g., review submitted through a virtual assistant), images, and video (e.g., photo posted of specific car model may suggest the user is the owner of that model). In some embodiments, non-text posts are converted to text using available conversion technology, e.g., image recognition processing for images and video or speech-to-text processing for audio.

In the illustrated embodiment, at block 904, the application analyzes the post data for potentially sensitive content using a machine learning classifier. In some embodiments, the application analyzes the post data for potentially sensitive content using a machine learning classifier. In some embodiments, the application trains the machine learning classifier with sensitive and non-sensitive entities to predict sensitive data values. In some embodiments, the classification models can be used to identify sensitive entities for classifications such as Employment status, Income level, Marital status, Parent status, etc.

In some embodiments, the application performs semantics processing to enhance text categorization by considering context of the text. In some embodiments, the application performs tone analysis to identify emotions associated with a post, such as posts expressing negative emotions that a user may not want to share, for example anger, disgust, or disappointment. In some embodiments, the application performs contentiousness analysis to identify posts that convey controversial topics by searching for posts having highly variant reactions, such as both a large number of "likes" or other indications of agreement from other users, and a large number of "dislikes" or other indications of disagreement from other users.

In some embodiments, the application combines posts having similar content, such as a common or synonymous terms, and evaluates the combined post data. In some such embodiments, the application collects a first portion of the post content from a first network accessible computer system and collects a second portion of the post content from a second network accessible computer system.

In the illustrated embodiment, at block 906, the application generates a sensitive data indicator and a confidence value based on the analysis of the post data. In some embodiments, the application generates a sensitive data indicator and a confidence value associated with the post data based on the results of the machine learning classifier. The sensitive data indicator identifies the post data as potentially containing sensitive information, and the confidence value represents a degree of certainty with which the machine learning classifier determined that the post data contains sensitive information.

In the illustrated embodiment, at block 908, the application generates explanatory data that identifies features of the post data that contributed to the potentially sensitive classification. In some embodiments, the application generates explanatory data associated with the sensitive data indicator of the post data. The explanatory data identifies one or more features of the post data that most strongly contributed to the results from the machine learning classifier. For example, in some embodiments, the feature is representative of a portion of the post content or a property of an intended audience of the post content when posted. In some embodiments, explanation algorithms can be used to determine features that caused classifier to predict sensitive category/classification (e.g., using open source libraries such as LIME or SHAP).

In the illustrated embodiment, at blocks 910-916, the application performs one or more iterations of tasks related to generating recommended edits by removing different combinations of terms from post content and recalculating the confidence score for the post data for each modified version of the post data until an acceptable score is achieved. In some embodiments, an acceptable confidence score is a confidence score that is below a threshold value preset by the application or by the user as part of the user preferences stored with the user information.

In the illustrated embodiment, at block 910, the application generates a modified version of the post data that includes a modification to the identified feature. In some embodiments, the application selects terms to edit based on terms detected to match a sensitive-content category generated by the application. In some embodiments, the application generates a modified version of the post data that changes the feature to have a modified feature value.

In the illustrated embodiment, at block 912, the application analyzes the modified version of the post data for potentially sensitive content using the machine learning classifier. In the illustrated embodiment, at block 914, the application generates a sensitive data indicator and a confidence value based on the analysis of the modified version of the post. In the illustrated embodiment, at block 916, the application determines whether the modified feature reduces the risk of exposing sensitive data. For example, in some embodiments, the application determines if the confidence value is lower than the confidence value from analysis of the post data prior to modification, and if the confidence value for the modified post data is lower than the threshold value, then the application recommends the modification to the user. In some embodiments, the modified feature includes a change to terms in the post content, such as replacing or deleting terms. In some embodiments, the modified feature includes a change to the audience of the post.

In some embodiments, if the application is unable to obtain an acceptable confidence score, the application recommends an alternative to editing the post content, for example the application may recommend that user anonymize or delete the post, or may recommend posting to different audience or create new group for the post (e.g., may recommend creating a niche private verified social media group), including providing a list of suggested audiences and associated risk scores, which may include a low-risk social space for verified user contacts that can provide a safe place for the discussion of a sensitive topic.

In the illustrated embodiment, at block 918, the application issues an alert to the user indicating the potentially sensitive nature of the post and recommends a post modification that changes the feature according to a change that reduced the risk of exposing sensitive information. In the illustrated embodiment, the alert comprises a recommendation for a post modification that changes a feature in the post data identified by the application that contributed to the post data being identified as potentially containing sensitive information. In some embodiments, the application determines whether to alert the user regarding potentially sensitive information based on a preset threshold value for a confidence value, risk value, or other aspect of the post data and the detected potentially sensitive information. In some embodiments, the application determines whether to alert the user regarding potentially sensitive information based on user preferences stored with the user information or otherwise set by the user.

In some embodiments, the application auto-generates alert content presented to the user based on one or more aspects of the evaluation performed at blocks 904-908 and/or blocks 912 and 914, such as the evaluated post data, the post content containing potentially sensitive information, the category detected to be associated with the post content, and/or a recommendation for a post modification to change a feature in the post data that contributed to the post data being identified as potentially containing sensitive information, such as changing a portion of the post content or change the location of the post so as to change the audience of the post content.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer-implemented method comprising:
associating post data of a request with a category from a predefined list of categories, the post data including data representative of post content authored by a user, the category being selected based on the post content and having a strongest correlation with the post content as compared to correlations of other categories in the list of categories;
adjusting a risk value associated with the category, by changing the risk value to a new risk value, the new risk value being based on an activity performed by an intended audience of the post content;
analyzing, using a machine learning classifier, the post data for potentially sensitive content;
generating, responsive to the analyzing of the post data, a first sensitive data indicator associated with the post data and a first confidence value, wherein the first sensitive data indicator identifies the post data as potentially containing sensitive information corresponding to the category, and wherein the first confidence value represents a first degree of certainty with which the machine learning classifier determined that the post data contains sensitive information;
generating, using an explanation algorithm, explanatory data associated with the first sensitive data indicator of the post data, wherein the explanatory data identifies (i) a feature of the post data that contributed to the machine learning classifier identifying the post data as potentially containing sensitive information, and (ii) a property of the intended audience at a time of the request;
generating, using a remedy module, a modified version of the post data that changes the feature to have a modified feature value, wherein a remedy option selector analyzes the post data in parallel with other processing to expedite processing of the post data;
analyzing, using the machine learning classifier, the modified version of the post data for potentially sensitive content;
generating, responsive to the analyzing of the modified version of the post data, a second sensitive data indicator associated with the modified version of the post data and a second confidence value, wherein the second sensitive data indicator identifies the modified version of the post data as potentially containing sensitive information, and wherein the second confidence value represents a second degree of certainty with which the machine learning classifier determined that the modified version of the post data contains sensitive information,
wherein the second confidence value differs from the first confidence value so as to indicate that the post data is more likely to contain sensitive data than the modified version of the post data; and
issuing an alert to the user indicating that the post data potentially contains sensitive data and recommending a post modification that changes the feature to have the modified feature value.

2. The method of claim 1, further comprising:
collecting the post data associated with the user from a network accessible computer system, the post data including content previously posted on a website by the user including said post content.

3. The method of claim 2, wherein the collecting of posting data comprises:
connecting to the network accessible computer system using a network identifier received from the user;
communicating with the network accessible computer system using a network protocol; and
authenticating with the network accessible computer system using user credentials received from the user.

4. The method of claim 1, further comprising:
receiving a post request comprising the post data from a user system, the post data including the post content prior to the post content being posted on a web site.

5. The method of claim 1, wherein the feature is representative of a property of an audience of the post content when posted.

6. The method of claim 5, wherein the issuing of the alert comprises recommending a change that changes the audience of the post content when posted.

7. The method of claim 1, wherein the feature is representative of a portion of the post content.

8. The method of claim 7, wherein the issuing of the alert comprises recommending a change that changes the portion of the post content.

9. The method of claim 1, further comprising:
collecting a first portion of the post content from a first network accessible computer system, the first portion of the post content including content previously posted on a first website by the user; and
collecting a second portion of the post content from a second network accessible computer system, the second portion of the post content including content previously posted on a second website by the user.

10. The method of claim 9, further comprising:
combining the first portion of the post content and the second portion of the post content in the post data based on an entity being present in the first portion of the post content and present in the second portion of the post content.

11. A computer program product comprising one or more computer readable storage media, and program instructions collectively stored on the one or more computer readable storage media, the program instructions executable by a processor to cause the processor to perform operations comprising:

associating post data of a request with a category from a predefined list of categories, the post data including data representative of post content authored by a user, the category being selected based on the post content and having a strongest correlation with the post content as compared to correlations of other categories in the list of categories;
adjusting a risk value associated with the category, by changing the risk value to a new risk value, the new risk value being based on an activity performed by an intended audience of the post content;
analyzing, using a machine learning classifier, the post data for potentially sensitive content;
generating, responsive to the analyzing of the post data, a first sensitive data indicator associated with the post data and a first confidence value, wherein the first sensitive data indicator identifies the post data as potentially containing sensitive information corresponding to the category, and wherein the first confidence value represents a first degree of certainty with which the machine learning classifier determined that the post data contains sensitive information;
generating, using an explanation algorithm, explanatory data associated with the first sensitive data indicator of the post data, wherein the explanatory data identifies (i) a feature of the post data that contributed to the machine learning classifier identifying the post data as potentially containing sensitive information, and (ii) a property of the intended audience at a time of the request;
generating, using a remedy module, a modified version of the post data that changes the feature to have a modified feature value, wherein a remedy option selector analyzes the post data in parallel with other processing to expedite processing of the post data;
analyzing, using the machine learning classifier, the modified version of the post data for potentially sensitive content;
generating, responsive to the analyzing of the modified version of the post data, a second sensitive data indicator associated with the modified version of the post data and a second confidence value, wherein the second sensitive data indicator identifies the modified version of the post data as potentially containing sensitive information, and wherein the second confidence value represents a second degree of certainty with which the machine learning classifier determined that the modified version of the post data contains sensitive information,
wherein the second confidence value differs from the first confidence value so as to indicate that the post data is more likely to contain sensitive data than the modified version of the post data; and
issuing an alert to the user indicating that the post data potentially contains sensitive data and recommending a post modification that changes the feature to have the modified feature value.

12. The computer program product of claim 11, wherein the stored program instructions are stored in a computer readable storage device in a data processing system, and wherein the stored program instructions are transferred over a network from a remote data processing system.

13. The computer program product of claim 11, wherein the stored program instructions are stored in a computer readable storage device in a server data processing system, and wherein the stored program instructions are downloaded in response to a request over a network to a remote data processing system for use in a computer readable storage device associated with the remote data processing system, further comprising:
program instructions to meter use of the program instructions associated with the request; and
program instructions to generate an invoice based on the metered use.

14. The computer program product of claim 11, further comprising:
collecting the post data associated with the user from a network accessible computer system, the post data including content previously posted on a website by the user including said post content.

15. The computer program product of claim 11, further comprising:
receiving a post request comprising the post data from a user system, the post data including the post content prior to the post content being posted on a web site.

16. The computer program product of claim 11, further comprising:
collecting a first portion of the post content from a first network accessible computer system, the first portion of the post content including content previously posted on a first website by the user;
collecting a second portion of the post content from a second network accessible computer system, the second portion of the post content including content previously posted on a second website by the user; and
combining the first portion of the post content and the second portion of the post content in the post data based on an entity being present in the first portion of the post content and present in the second portion of the post content.

17. A computer system comprising a processor and one or more computer readable storage media, and program instructions collectively stored on the one or more computer readable storage media, the program instructions executable by the processor to cause the processor to perform operations comprising:
associating post data of a request with a category from a predefined list of categories, the post data including data representative of post content authored by a user, the category being selected based on the post content and having a strongest correlation with the post content as compared to correlations of other categories in the list of categories;
adjusting a risk value associated with the category, by changing the risk value to a new risk value, the new risk value being based on an activity performed by an intended audience of the post content;
analyzing, using a machine learning classifier, the post data for potentially sensitive content;
generating, responsive to the analyzing of the post data, a first sensitive data indicator associated with the post data and a first confidence value, wherein the first sensitive data indicator identifies the post data as potentially containing sensitive information corresponding to the category, and wherein the first confidence value represents a first degree of certainty with which the machine learning classifier determined that the post data contains sensitive information;
generating, using an explanation algorithm, explanatory data associated with the first sensitive data indicator of the post data, wherein the explanatory data identifies (i) a feature of the post data that contributed to the machine learning classifier identifying the post data as potentially containing sensitive information, and (ii) a property of the intended audience at a time of the request;

generating, using a remedy module, a modified version of the post data that changes the feature to have a modified feature value, wherein a remedy option selector analyzes the post data in parallel with other processing to expedite processing of the post data;

analyzing, using the machine learning classifier, the modified version of the post data for potentially sensitive content;

generating, responsive to the analyzing of the modified version of the post data, a second sensitive data indicator associated with the modified version of the post data and a second confidence value, wherein the second sensitive data indicator identifies the modified version of the post data as potentially containing sensitive information, and wherein the second confidence value represents a second degree of certainty with which the machine learning classifier determined that the modified version of the post data contains sensitive information, wherein the second confidence value differs from the first confidence value so as to indicate that the post data is more likely to contain sensitive data than the modified version of the post data; and issuing an alert to the user indicating that the post data potentially contains sensitive data and recommending a post modification that changes the feature to have the modified feature value.

18. The computer system of claim 17, further comprising:
collecting the post data associated with the user from a network accessible computer system, the post data including content previously posted on a website by the user including said post content.

19. The computer system of claim 17, further comprising:
receiving a post request comprising the post data from a user system, the post data including the post content prior to the post content being posted on a web site.

20. The computer system of claim 17, further comprising:
collecting a first portion of the post content from a first network accessible computer system, the first portion of the post content including content previously posted on a first website by the user;

collecting a second portion of the post content from a second network accessible computer system, the second portion of the post content including content previously posted on a second website by the user; and combining the first portion of the post content and the second portion of the post content in the post data based on an entity being present in the first portion of the post content and present in the second portion of the post content.

* * * * *